United States Patent
Chong et al.

(10) Patent No.: US 7,706,996 B2
(45) Date of Patent: Apr. 27, 2010

(54) WRITE-SIDE CALIBRATION FOR DATA INTERFACE

(75) Inventors: Yan Chong, San Jose, CA (US);
Chiakang Sung, Milpitas, CA (US);
Joseph Huang, Morgan Hill, CA (US);
Michael H. M. Chu, Fremont, CA (US)

(73) Assignee: Altera Corporation, San Jose, CA (US)

( * ) Notice: Subject to any disclaimer, the term of this patent is extended or adjusted under 35 U.S.C. 154(b) by 224 days.

(21) Appl. No.: 11/735,394

(22) Filed: Apr. 13, 2007

(65) Prior Publication Data
US 2007/0277071 A1 Nov. 29, 2007

Related U.S. Application Data

(60) Provisional application No. 60/793,864, filed on Apr. 21, 2006.

(51) Int. Cl.
*G06F 11/00* (2006.01)
*G06F 19/00* (2006.01)

(52) U.S. Cl. .................. 702/89; 702/1; 702/79; 702/85; 702/127; 702/176; 714/699; 714/700; 714/798

(58) Field of Classification Search ............... 73/432.1, 73/865.9; 324/158.1, 500, 511, 520, 521, 324/527, 532, 535; 702/1, 57, 66, 79, 85, 702/89, 127, 176, 182, 183, 186, 189; 714/1, 714/25, 40, 41, 42, 43, 44, 55, 56, 100, 699, 714/700, 798
See application file for complete search history.

(56) References Cited

U.S. PATENT DOCUMENTS

| | | | | | |
|---|---|---|---|---|---|
| 3,007,055 | A | * | 10/1961 | Herzfeld ................ 327/130 |
| 3,204,180 | A | * | 8/1965 | Bray et al. ................ 368/120 |
| 3,239,809 | A | * | 3/1966 | Cogar et al. ............... 714/700 |
| 3,456,237 | A | * | 7/1969 | Collins .................... 714/700 |
| 3,509,531 | A | * | 4/1970 | Wilkinson et al. .......... 714/700 |
| 3,562,723 | A | * | 2/1971 | Behr et al. ................ 360/26 |
| 3,976,940 | A | * | 8/1976 | Chau et al. ................ 714/736 |
| 4,092,589 | A | * | 5/1978 | Chau et al. ................ 714/736 |
| RE31,056 | E | * | 10/1982 | Chau et al. ................ 714/700 |
| 4,477,845 | A | * | 10/1984 | Mortlock et al. ............ 360/26 |
| 4,497,056 | A | * | 1/1985 | Sugamori ................. 714/736 |
| 5,175,452 | A | * | 12/1992 | Lupi et al. ................ 327/262 |
| 5,274,568 | A | * | 12/1993 | Blinne et al. ............... 716/6 |
| 5,306,971 | A | * | 4/1994 | McCune ................... 327/270 |

(Continued)

OTHER PUBLICATIONS

U.S. Appl. No. 11/040,324, Thorne.

*Primary Examiner*—Edward R Cosimano
(74) *Attorney, Agent, or Firm*—Townsend and Townsend and Crew LLP; David B. Raczkowski

(57) ABSTRACT

Circuits, methods and apparatus are provided to reduce skew among signals being provided or transmitted by a data interface. Signal path delays are varied such that signals transmitted by a memory interface are calibrated or aligned with each other along a rising and/or falling edge. For example, self-calibration, external circuitry, or design tools can provide skew adjustment of each output channel by determining one or more delays for each output channel path. When aligning multiple edges, the edges of the output signals may be aligned independently, e.g., using edge specific delay elements.

25 Claims, 7 Drawing Sheets

U.S. PATENT DOCUMENTS

| | | | | |
|---|---|---|---|---|
| 5,338,990 | A * | 8/1994 | Lou | 327/264 |
| 5,459,422 | A * | 10/1995 | Behrin | 327/276 |
| 5,485,114 | A * | 1/1996 | Funakura et al. | 327/262 |
| 5,811,655 | A * | 9/1998 | Hashimoto et al. | 73/1.42 |
| 5,935,257 | A * | 8/1999 | Nishimura | 713/503 |
| 5,953,284 | A | 9/1999 | Baker et al. | |
| 6,041,417 | A | 3/2000 | Hammond et al. | |
| 6,147,963 | A | 11/2000 | Walker et al. | |
| 6,338,127 | B1 | 1/2002 | Manning | |
| 6,381,340 | B1 * | 4/2002 | Storey | 382/100 |
| 6,424,592 | B1 * | 7/2002 | Maruyama | 365/233.1 |
| 6,587,811 | B2 * | 7/2003 | Schleifer et al. | 702/176 |
| 6,606,041 | B1 * | 8/2003 | Johnson et al. | 341/120 |
| 6,636,978 | B1 * | 10/2003 | Kirihata et al. | 713/400 |
| 6,647,523 | B2 | 11/2003 | Manning | |
| 6,876,186 | B1 * | 4/2005 | Gupta | 324/76.54 |
| 6,961,095 | B2 * | 11/2005 | Keating et al. | 348/497 |
| 7,038,466 | B1 * | 5/2006 | Gupta | 324/601 |
| 7,113,012 | B2 * | 9/2006 | Amin | 327/161 |
| 7,171,321 | B2 * | 1/2007 | Best | 702/106 |
| 7,279,946 | B2 * | 10/2007 | Minzoni | 327/158 |
| 7,289,378 | B2 * | 10/2007 | Ivanov | 365/194 |
| 7,308,059 | B2 * | 12/2007 | Pasqualino et al. | 375/354 |
| 7,352,219 | B2 * | 4/2008 | Minzoni | 327/175 |
| 7,450,676 | B2 * | 11/2008 | Pasqualino et al. | 375/354 |
| 7,451,049 | B2 * | 11/2008 | Feiereisel et al. | 702/68 |
| 7,453,746 | B2 * | 11/2008 | Ivanov | 365/194 |
| 7,484,193 | B2 * | 1/2009 | Sarkar et al. | 716/6 |
| 7,489,569 | B2 * | 2/2009 | Ivanov | 365/194 |
| 2002/0048336 | A1 * | 4/2002 | Keating et al. | 375/371 |
| 2002/0064082 | A1 * | 5/2002 | Maruyama | 365/233 |
| 2002/0103618 | A1 * | 8/2002 | Schleifer et al. | 702/176 |
| 2002/0131619 | A1 * | 9/2002 | Storey | 382/103 |
| 2002/0186717 | A1 * | 12/2002 | Haq et al. | 370/503 |
| 2003/0099135 | A1 * | 5/2003 | Stubbs | 365/194 |
| 2003/0149987 | A1 * | 8/2003 | Pasqualino et al. | 725/80 |
| 2004/0217794 | A1 * | 11/2004 | Strysko | 327/263 |
| 2005/0024109 | A1 * | 2/2005 | Amin | 327/161 |
| 2005/0057978 | A1 * | 3/2005 | Stubbs | 365/194 |
| 2005/0094462 | A1 * | 5/2005 | Jakobs | 365/222 |
| 2005/0190875 | A1 * | 9/2005 | Feiereisel et al. | 375/356 |
| 2005/0219919 | A1 * | 10/2005 | Ivanov | 365/194 |
| 2006/0052961 | A1 * | 3/2006 | Best | 702/106 |
| 2006/0244492 | A1 * | 11/2006 | Lee | 327/24 |
| 2007/0046346 | A1 * | 3/2007 | Minzoni | 327/158 |
| 2007/0046351 | A1 * | 3/2007 | Minzoni | 327/175 |
| 2007/0061536 | A1 * | 3/2007 | Ivanov | 711/167 |
| 2007/0282555 | A1 * | 12/2007 | Chong et al. | 702/107 |
| 2008/0089456 | A1 * | 4/2008 | Pasqualino et al. | 375/356 |
| 2008/0240222 | A1 * | 10/2008 | Cranford et al. | 375/232 |

* cited by examiner

WRITE-SIDE CALIBRATION FOR DATA INTERFACE

CROSS-REFERENCES TO RELATED APPLICATIONS

This application claims the benefit of U.S. Provisional Application No. 60/793864 filed Apr. 21, 2006, entitled "Write-Side Calibration," by Yan Chong et al., the disclosure of which is incorporated herein by reference in its entirety.

This application is related to U.S. provisional patent application No. 60/793,838 filed Apr. 21, 2006, entitled "A Read Side Calibration Scheme to Improve Read Timing Margin for External Memory Interface Applications in FPGA Devices," by Yan Chong et al.; to concurrently filed and commonly owned U.S. patent application No. 11/735,386 filed Apr. 13, 2007, now U.S. Pat. No. 7,509,223, entitled "Read-Side Calibration for Data Interface" by Yan Chong et al.; and to concurrently filed and commonly owned U.S. patent application No. 11/735,401 filed Apr. 13, 2007, now U.S. Pat. No. 7,525,360, entitled "I/O Duty Cycle and Skew Control", by Xiaobao Wang et al., which are incorporated by reference for all purposes.

BACKGROUND

The present invention relates to high-speed data interfaces, and more particularly to reducing skew between outputs provided by high-speed data interfaces.

The demand for higher speed data interfaces has increased dramatically the past few years, and this increase shows no signs of abating. As an example, huge amounts of data must be transferred from memory devices to other integrated circuits for such applications as music and video playback, image processing, graphics, and others. Many of these demanding applications run on advanced field programmable gate arrays (FPGAs) such as those developed by Altera Corporation of San Jose, Calif.

New interface techniques, such as Double data rate (DDR) and others, have been developed to support these data rates. In a DDR interface, data is read on each (rising and falling) edge of a strobe or clock signal. Output signals for DDR memory interfaces include a data strobe (DQS) signal that is transmitted along with a group of data (DQ) signals that are captured or received by a receiver on a second interface. Typically, when data is being transmitted from the FPGA (i.e. data is being written), the DQS signal is center aligned with the data signals to ensure accurate receipt of the data.

Since data is read on each edge of the DQS signal, the timing margins at these interfaces are greatly reduced. For future DDR memory devices that target the 800 Mbs to 1 Gbs data rate ranges, the timing budget left for errors caused by the memory controller becomes quite demanding. This demand places a strict burden on the FPGA transmitting circuitry, and may be compounded by environmental effects on the device during operation. To improve this write timing margin and center alignment of the DQS signal with the data signals, it is important to reduce skew between the signals.

Accordingly, what is needed are circuits, methods, and apparatus that reduce skew among signals being transmitted at a data interface. For example, what is needed are circuits, methods, and apparatus that reduce skew among the DQ and DQS signals at a data interface, such as a data interface on an FPGA device.

SUMMARY

Accordingly, embodiments of the present invention provide circuits, methods and apparatus that reduce skew among signals being provided or transmitted by a data interface. Signal path delays are varied such that signals transmitted by a memory interface are calibrated or aligned with each other along a rising and/or falling edge. In one aspect, self-calibration circuitry provides post-manufacturing skew adjustment of each output channel by determining one or more delays in each output channel path. The rising or falling edges may be used for this initial alignment. In another aspect, both edges of the output signals may be aligned independently by the calibration circuitry or by external circuitry or other methods. An edge alignment may be accomplished with delays that are edge specific.

According to one exemplary embodiment, a circuit includes control circuitry that sends a first test signal to a plurality of output channels. Each channel has an output timing device for receiving the test signal and one or more channel delays between the output timing device and an output pad. A channel also has a calibration timing device that receives a channel signal from the channel delays and outputs a signal to the control circuitry. The clock signal that triggers the output timing device is delayed by one or more clock delays, and the resulting delayed clock signal triggers the calibration timing device. The channel delays and the clock delays are programmable via one or more delay control signals from the control circuitry.

For each output channel, the control circuitry performs a skew adjustment by determining a relative timing between the channel signal and clock signal at the calibration timing device, where the relative timing is based on the output of the calibration timing device. Using the relative timing information, a first edge of the first channel signals is aligned by adjusting at least one of the delays (i.e. any one of the channel or clock delays).

In one embodiment, the first edge is aligned by incrementing a first clock delay until all of the outputs of the calibration timing devices have a same logic value. Then, for each output channel, a first channel delay is incremented until the output of the calibration timing device for that output channel changes a logic value.

In another embodiment, a second edge of signals at the data input of the calibration devices are aligned. In one aspect, the second edge is aligned by transmitting a second test signal to each output timing device. A relative timing between a channel signal and a clock signal is again determined at each calibration timing device, and an alignment of the second edge is accomplished by adjusting at least another one of the delays.

In one embodiment, a second clock delay and a second channel delay for each output channel are coupled with a same delay control signal. In one aspect, each second channel is adapted to delay only the first edge of a signal. The second edge may then be aligned by incrementing the second clock delay and second channel delay until all of the outputs of the calibration timing devices have a same logic value. Then, for each output channel, a third channel delay is incremented until the output of the calibration timing device for that output channel changes a logic value, where the third channel delay is adapted to delay only the second edge of a signal.

According to another exemplary embodiment, a method of aligning output signals at a data interface is provided. A rising edge delay in each of a plurality of output signal paths is determined; and a falling edge delay in each of the output signal paths is determined. The determined rising edge delays and the falling edge delays provide an alignment of the rising and falling edges of the output signals.

In one embodiment, the method also includes determining a first output delay in each of the output signal paths; and determining a first clock delay in the clock signal path so that a first edge of each of the output signals are aligned with each other and with the clock signal. In one aspect, the first clock delay is incremented until all of the first edges of the output signals are negatively phase shift from the clock signal. In another aspect, the first output delay in each of the output signal paths is incremented until each output signal has a zero or greater phase shift compared to the clock signal.

In one embodiment, one of the rising or falling edge delays has the same value as a second clock delay and aligns the duty cycle of the output signals with the duty cycle of the clock signal. This one delay may be incremented until all of the second edges of the output signals are negatively phase shifted from the clock signal. In one aspect, each of that one delay is equal to a second delay in the clock signal path. The second of the rising or falling edge delays can be used to align the second edge of each of the output signals. This second delay may be incremented until each output signal is zero or greater phase shifted from the clock signal.

In one embodiment, the method also includes storing the determined delay values in respective memory elements that are coupled with output and clock delay elements so that the delay elements are programmed to have the determined delays. In another embodiment, circuitry that is not on a same integrated circuit as the data interface determines the rising edge delay and the falling edge delay.

A better understanding of the nature and advantages of the present invention may be gained with reference to the following detailed description and the accompanying drawings.

DESCRIPTION OF EXEMPLARY EMBODIMENTS

Embodiments of the present invention provide circuits, methods and apparatus that reduce skew among signals being provided or transmitted by a data interface. Self-calibration circuitry can provide post-manufacturing skew adjustment of each output channel by determining a delay in each output channel path. The rising or falling edges may be used for this initial alignment. Additionally, both edges of the output signals may be aligned by the calibration circuitry or by external circuitry or methods. The other edge alignment may be accomplished with delays that are edge specific. This alignment facilitates using new and faster memory interfaces. While specific embodiments of the present invention are well suited to DDR interfaces on FPGA devices, other types of interfaces and other types of devices (e.g., an ASIC) and circuits may be improved by the incorporation of an embodiment of the present invention.

Figure 1:
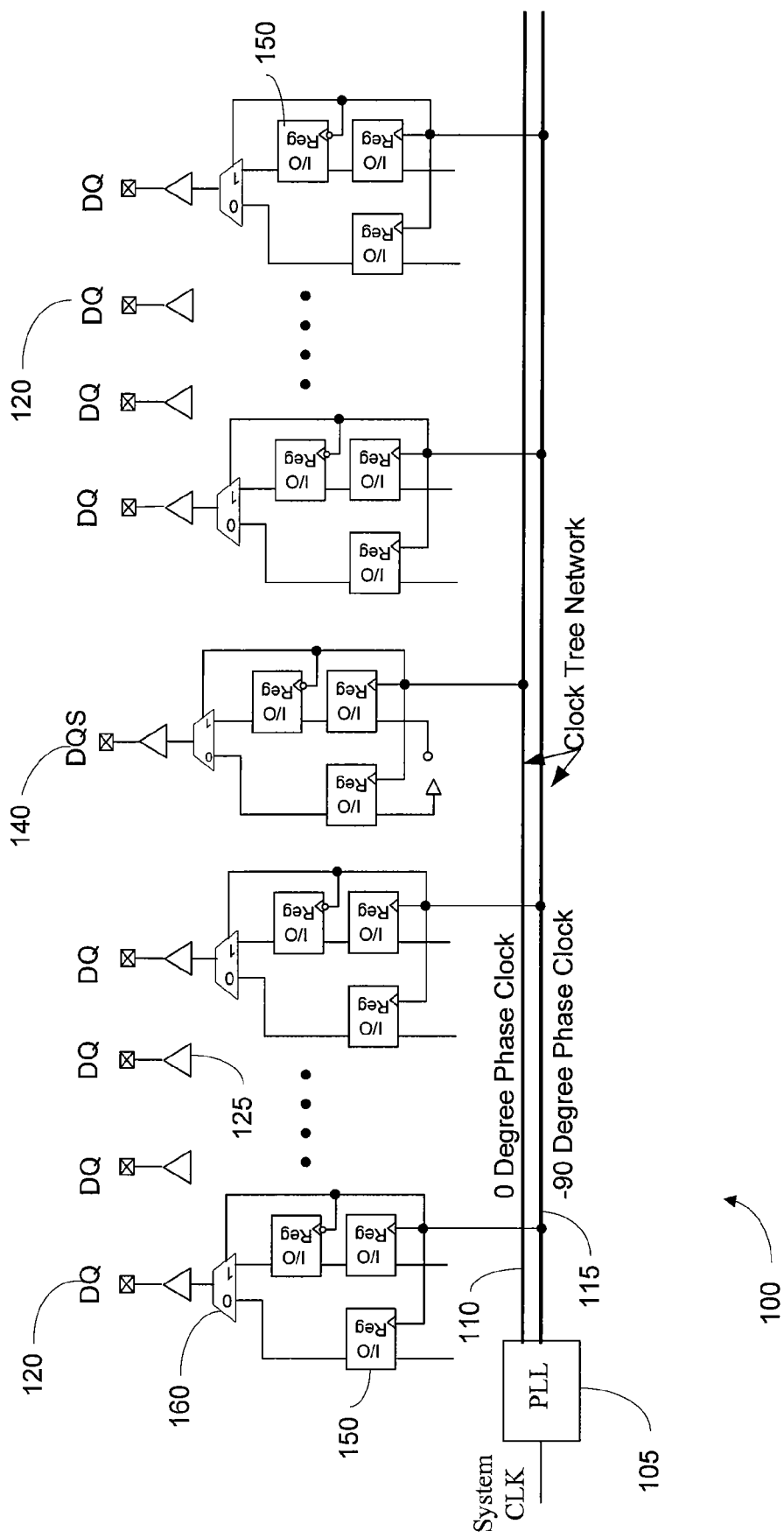
FIG. 1 is a block diagram of a data interface according to an embodiment of the present invention.

FIG. 1 is a block diagram of a data interface 100 according to an embodiment of the present invention. During a write operation, data interface 100, such as a DDR interface on an FPGA, provides or transmits DQ 120 and DQS 140 signals to a memory device (not shown). These DQS and DQ signals are center aligned, that is, rising and falling edges of the DQS signal are aligned with the centers of data bits of the DQ signals. The DQS signal can then be used inside the memory device to capture the DQ signals. This block diagram illustrates circuitry for one DQ/DQS group of signals having 8 DQ signals 120 and one DQS signal 140. For a 72-bit DDR memory interface, there would be nine x8 DQ/DQS groups.

A balanced clock tree structure is introduced as a reference signal used to align signals in the DQ and DQS output path. A phase-locked loop (PLL) 105 generates clock signals 110, 115 at right angles to each other. In this example, clock signal 110 is at a zero degree phase and clock signal 115 is at a negative 90 degree phase. The zero degree phase clock 110 is used to generate DQS and the negative 90 degree phase clock 115 is used to generate the DQ signals. The clock signals 115 trigger output of the data signals from DDR output registers 150, and multiplexer (mux) 160 combines the data signals to form a DDR output signal.

When arranging a clock tree structure, a balanced structure with minimum skew is desired as it is used as a matching reference. For example, one clock tree covering the whole 72-bit memory interface typically has more clock skew than a shorter clock tree that covers only one x8 DQ/DQS group. Even when care is taken to match signal paths and device sizes, matching errors, such as differences in transistor sizes in different signal paths, can cause skew and timing mismatches. Accordingly, embodiments of the present invention adjustably vary delays provided by elements inserted in the paths of data interface output signals to align the signals. After an edge alignment, the center alignment can be obtained via the two clocks 110, 115.

In one aspect, initial skew adjustment delay chains in both the DQ and DQS output paths are used for an initial alignment. In other aspects, there are two variable delay chains Tr and Tf, which can adjust the output buffer rising edge delay (Tr) and falling edge delay (Tf) independently. Tr and Tf may reside within each output buffer 125. The initial skew adjustment delay chains and Tr and Tf are variable delay chains whose delay setting can be programmed or provided by write-side calibration control circuitry. An example of the output paths and delay circuitry used by embodiments of the present invention is shown in the next figure.

Figure 2:
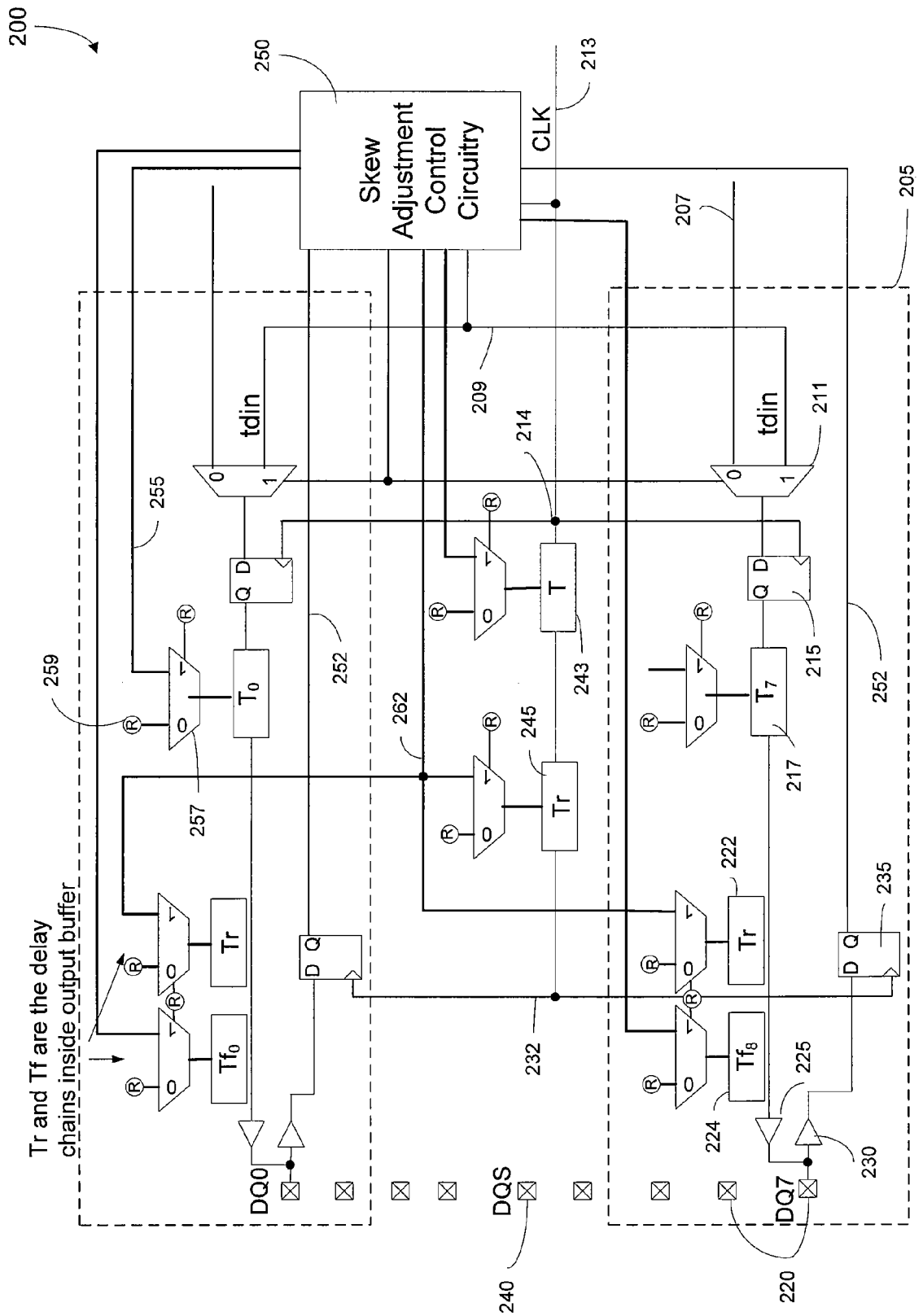
FIG. 2 is a block diagram of a data interface having output paths and delay circuitry according to an embodiment of the present invention.

FIG. 2 is a block diagram of a data interface 200 having output paths (channels) 205 and delay circuitry according to an embodiment of the present invention. Only one x8 DQ/DQS group is shown, with 8 output pads 220 for the DQ channels and one output pad 240 for the DQS channel. The delay and skew calibration circuitry of only two channels 205 are depicted for ease of presentation. One skilled in the art will appreciate that other configurations and numbers of channels are contemplated by the present invention.

During normal operation of a device having data interface 200, an output signal is received by a channel on line 207. The output signal at this point may be a single or multiple data rate signal, and thus line 207 may correspond to more than one input line. Multiplexer 211 can select and output the data signal to an output timing device 215, which may be a single register, a combination of multiple registers and a mux (as shown in FIG. 1), or any other combination of latches, flip-flops, or other suitable devices. A clock signal CLK on line 213 travels to node 214, which is coupled to respective clock inputs of the output registers 215.

Upon being triggered (rising or falling) by the CLK signal, the data signal may travel though an initial channel delay chain 217. In one aspect, channel delay 217 shift both rising and falling edges. The $T_i$ for the ith channel indicates that channel delay 217 can be varied independently from the other channels. The output of channel delay 217 is coupled with output buffer 225, which can contain rising edge channel delay 222 and falling edge channel delay 224 that only delay a respective edge. Embodiments have at least one of the channel delays 217, 222, and 224 in the output channel, but only one may be used for certain applications while all three may be used for other applications. In some embodiments, the one or more channel delays may be in series or in parallel (or any combination thereof); but in either case, the respective inputs are coupled with a respective output register 215 and the respective outputs are coupled with a respective output pad 220, 240.

During calibration, a skew adjustment control circuitry 250 sends out a test signal Tdin on line 209. The test signal may be produced by a state machine in control circuitry 250. The edges of Tdin may be used to equilibrate the delays in the output paths from the respective output registers 215 to the output pads 220 or 240. In one aspect, Tdin also travels from output buffer 225 through an input buffer 230 to a calibration register 235. Thus, the relative timings of the output signals at the respective output pads 220, 240 may be estimated as being equal to the relative timings at the respective calibration registers 235.

The relative timings at the calibration registers 235 are obtained using a delayed CLK signal on line 232. In one embodiment, the CLK signal travels through a first clock delay 243. The CLK signal may also travel through a second clock delay 245. In one aspect, clock delays 243 and 245 delay both rising and falling edges. In some embodiments, the one or more clock delays may be in series or in parallel (or any combination thereof); but in either case, the inputs are coupled with node 214 and the outputs are coupled with line 232. Triggered by the delayed CLK signals, the outputs of the calibration registers 235 are then received by control circuitry 250, which can identify a relative timing between an output signal and the delayed CLK signal by the value received on a respective line 252.

Based on these relative timings, control circuitry 250 can transmit controls signals to vary the delays in the channel and clock delays. For example, the initial channel delay 217 can be controlled by a signal on line 255. A multiplexer 257 can be set to deliver that control signal to channel delay 217. In some embodiments, the delay can be programmed from bits in memory 259, such as CRAM bits or other suitable types of memory. In such embodiments, control circuitry, which is external to the integrated chip containing data interface 200, may be used. The other delays may be programmed or controlled in a similar manner. In one embodiment, the control signals 262 for the second clock delay 245 are also coupled with the rising edge channel delays 222. In another embodiment, the control signals 262 for the second clock delay 245 are also coupled with the falling edge channel delays 224.

Accordingly, the DQ/DQS signals may be variably delayed relative to each other, either during configuration or during a calibration routine. The calibration routine may be performed in the final device and in actual environmental conditions (such as temperature, humidity, pressure), which would normally affect the skew. Thus, skews in each DQ and DQS path may be matched in a specific integrated circuit. Further, in some embodiments, rising and falling edges are skewed independently. Embodiments of the present invention encompass a multitude of different methods of performing an alignment. The following is one example.

Figure 3:
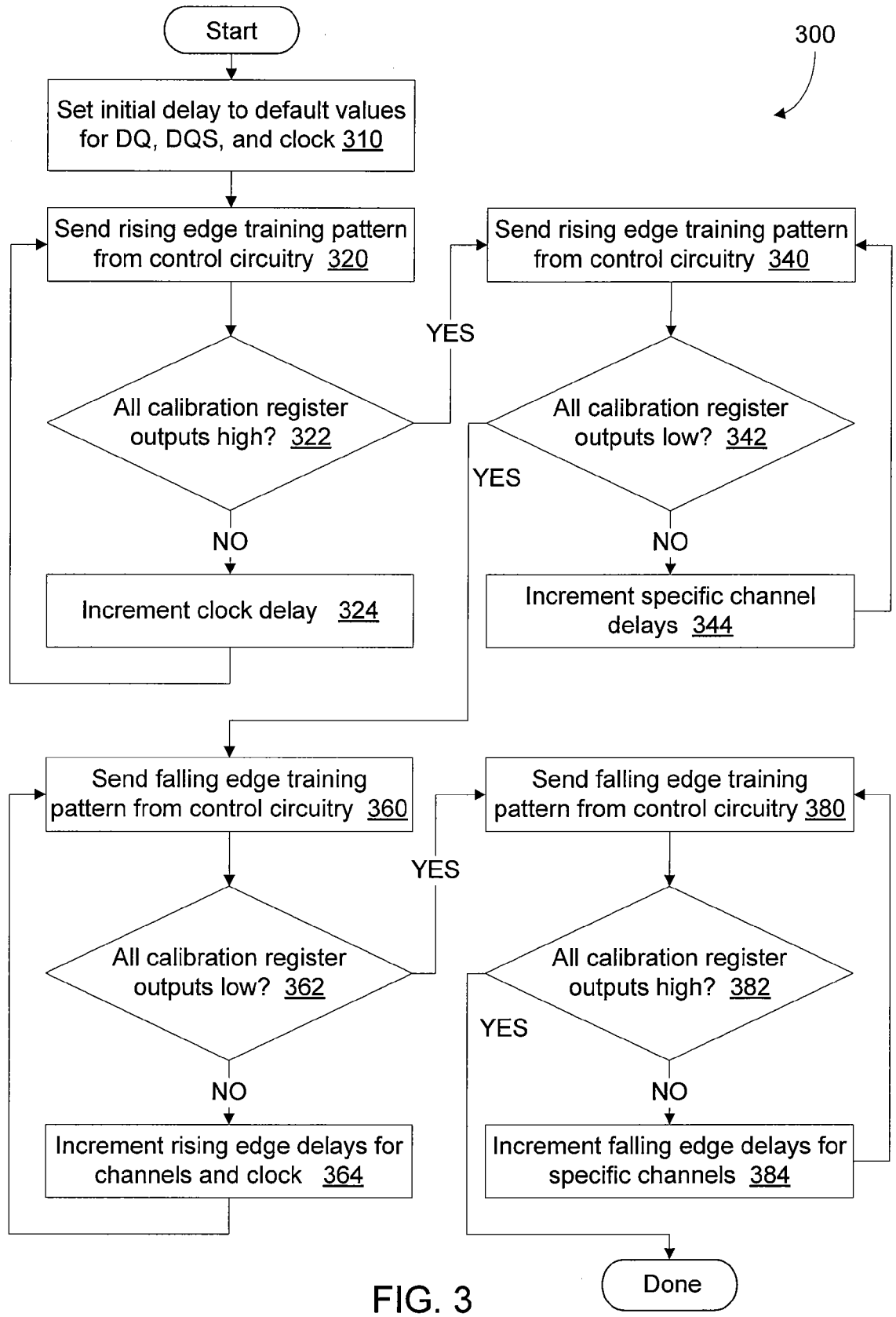
FIG. 3 is a flowchart illustrating a method of aligning output signals according to an embodiment of the present invention.

FIG. 3 is a flowchart illustrating a method 300 of aligning output signals according to an embodiment of the present invention. In a first stage (steps 320-344), a first edge skew is adjusted. The first edge may be a rising edge or a falling edge of the output signals, but for ease of presentation this example will assume that the first edge is a rising edge. In a second stage (steps 360-364), the duty cycle or width of the output signals is bounded in relation to a reference clock signal, thus allowing for accurate and consistent alignment of the second edge. In a third stage (steps 380-384), the second edge is aligned. In one embodiment, only the first stage is performed.

In step 310, the channel delays and the clock delays are set to a default value. In one aspect, the default value is zero. In step 320, a first test pattern is sent from control circuitry 250 to each channel 205. In one embodiment, the test pattern for aligning the rising edges has a low to high transition and the test pattern for aligning the falling edges has a high to low transition. Relative timings for pertinent signals are shown via timing diagrams.

Figure 4:
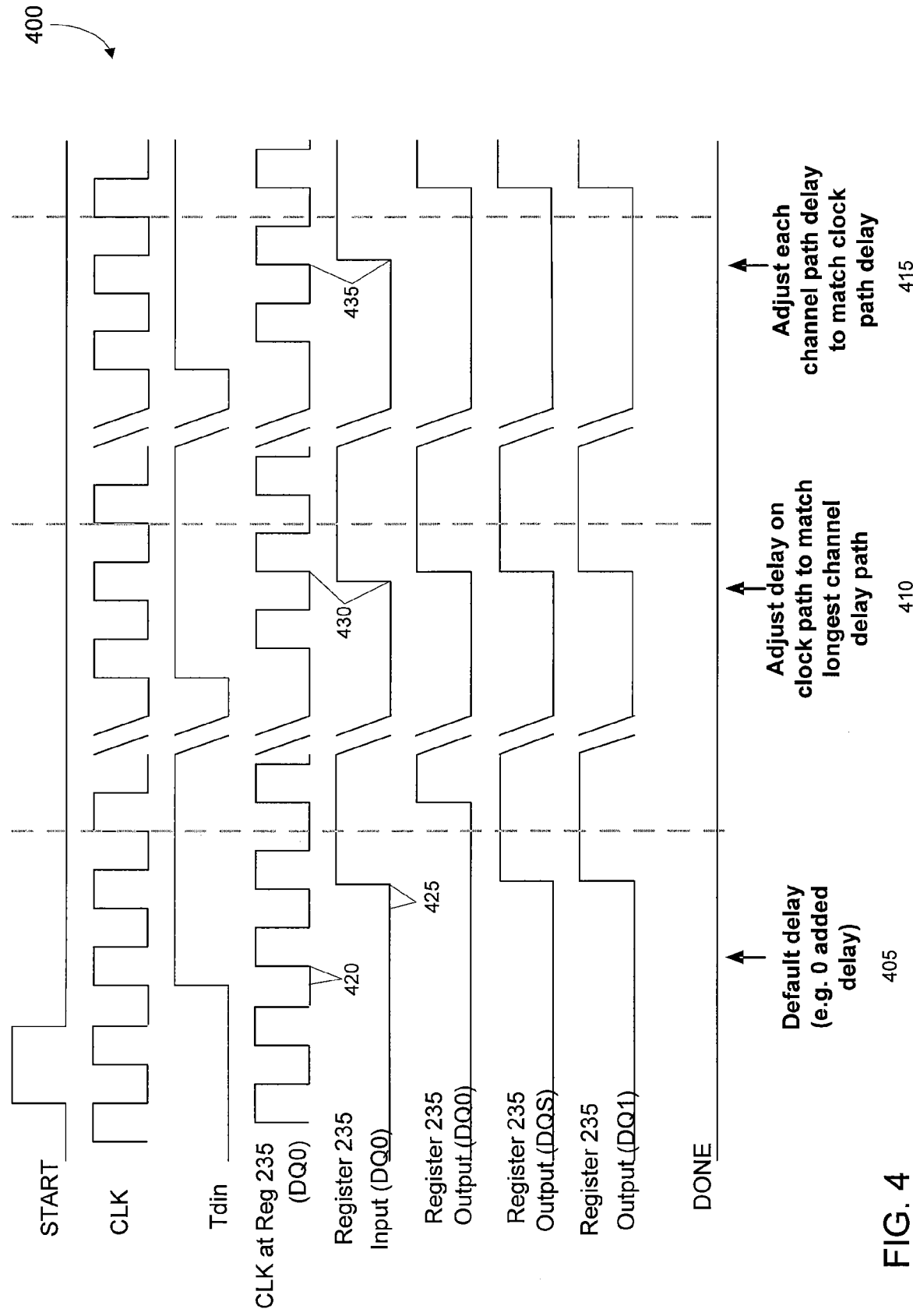
FIG. 4 illustrates a timing diagram for a first stage of a method according to an embodiment of the present invention.

FIG. 4 illustrates a timing diagram 400 for the first stage of method 300 according to an embodiment of the present invention. Note that the delay of the output signal path and the delay of clock path are compared at a calibration register 235. If the output signal delay is longer, a 0 (or a 1 for falling delay case) is captured in calibration register 235. If the output signal delay is shorter, a 1 (or a 0 for falling delay case) is captured in calibration register 235.

A first section 405 of timing diagram 400 shows a default relative timing of the CLK signal at calibration register 235 of channel DQ0, the output signals at the data input of calibration register 235 of channel DQ0, and the outputs 252 of calibration register 235 for channels DQ0, DQS, and DQ1. Initially, the CLK signal and the Tdin signal have a rising edge that is aligned at output register 215.

The clock baseline delay 420 is shown for the CLK signal from node 214 to the clock input of calibration register 235 of channel DQ0. Clock baseline delay 420 between rising edges of corresponding pulses is a combination of inherent delay in the CLK line and the default delay in the clock delays 243, 245. The data baseline delay 425 is shown for the output signal from the output register 215, which for a high logic value occurs at the fourth clock pulse shown, to the calibration register 235 for channel DQ0.

As shown, the rising edge of the data input at calibration register 235 of DQ0 occurs just after the rising edge (a positive phase shift) of the CLK signal at that same calibration register. Thus, the output 252 for channel DQ0 stays zero until the next rising edge from the CLK signal. The inputs for channels DQS and DQ1 are negatively phase shifted from the CLK signal as the inputs at the respective calibration register 235 for these channels have already transitioned from 0 to 1 before the CLK signal transitions. Thus, the outputs 252 of the calibration registers 235 of these channels are '1'.

In step 322, the control circuitry 250 determines whether all of the calibration outputs 252 are high. Thus, for the example of FIG. 4, it would be determined that channel DQ0 is not high. Accordingly, in step 324 a clock delay is incremented, e.g., first clock delay 243. If all of the calibration outputs 252 are high, the method 300 proceeds from step 322 to 340. The steps 320-324 are repeated until all of the calibration registers 235 capture 1s, which means that the clock path delay will match with the longest rising edge delay. In other embodiments, where the falling edge is aligned in the first stage, clock delay 243 would be incremented until only 0s are captured. Any of the stages may be done by any number of methods including the example of method 300. For example, if the default delay values are non-zero, the first stage may be accomplished by only varying (incrementing or decrementing) the channel delays.

Section 410 of FIG. 4 shows the result of increasing the clock delay. The delay 430 between the signals at the clock input and data input of the calibration register 235 of channel DQ0 now shows that the data signal of DQ0 is negatively phase shifted compared to the CLK signal, as are all of the other output signals.

Next in method 300, one of the channels delays, such as delay 217, in each output channel may be individually incremented. In other embodiments, rising edge delays 222 and/or falling edge delays 224 could be used in the first stage, particularly when the other stages of method 300 are not performed.

In step 340, a rising edge pattern is sent again. In step 342, control circuitry 250 determines whether all of the calibration register outputs are low. In the first pass, this should not be true as all of the outputs were just '1'. In step 344, a channel delay, e.g., channel delay 217, for each channel that is not zero is incremented. If an output is already low then a delay for that channel is not incremented. Steps 340-344 are repeated until all of the outputs of the calibration registers 235 change from 1 to 0. By doing so, the rising delay for each channel will match with clock path delay.

Section 415 of FIG. 4 shows the result of increasing the respective channel delays. The delay 435 between the signals at the clock input and data input of the calibration register 235 of channel DQ0 now shows that the data signal of DQ0 is positively (zero or greater) phase shifted compared to the CLK signal. All of the other output signals have similar timings as evidenced by the low output from the calibration registers 235 of the other channels.

After finishing a rising edge skew adjustment, a next step can be to adjust the falling edge skew, or vice versa if the falling edge is aligned first. In step 360, a falling edge test pattern is sent to each channel. In step 362, control circuitry 250 determines whether all of the calibration register outputs are low. The second and third stages are shown in the next timing diagram.

Figure 5:
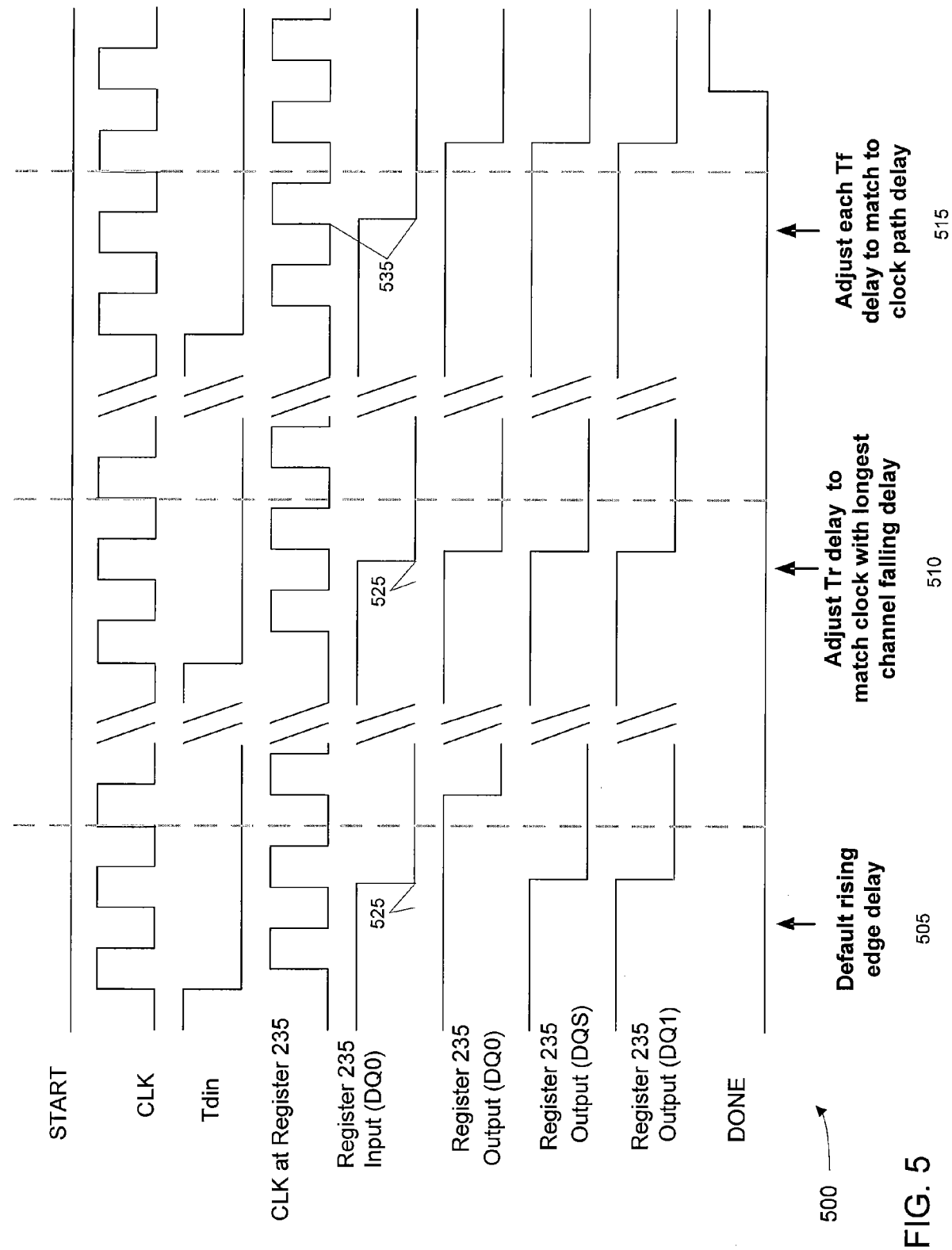
FIG. 5 illustrates a timing diagram for second and third stages of a method according to an embodiment of the present invention.

FIG. 5 illustrates a timing diagram 500 for second and third stages of method 300 according to an embodiment of the present invention. A first section 505 shows a relative timing with the falling edge test pattern. The current delay for the CLK signal from node 214 to the clock input of calibration register 235 of channel DQ0 includes the delay from the first clock delay 243. The falling edge delay 525 is shown for the output signal from the output register 215, which for a low logic value occurs at the second clock pulse shown, to the calibration register 235 for channel DQ0. Delay 525 includes delay from the respective channel delay 217.

As shown, the falling edge of the data input at calibration register 235 of DQ0 occurs just after (positive phase shift) the rising edge of the CLK signal at that same calibration register. Thus, the output for channel DQ0 stays '1' until the next rising edge from the CLK signal. Note that for a falling edge clocked register, a falling edge of the CLK signal could be used. The inputs for channels DQS and DQ1 having falling edges that are negatively phase shifted from the CLK rising edge signal as these output signals have already transitioned from '1' to '0' before the CLK rising edge. Thus, the outputs of the calibration registers of these channels are '0'.

In step 364, if all of the outputs of the calibration registers 235 are not low, then the rising edge delay Tr for the clock path is increased. This delay will affect both edges of the clock signal. As shown in the embodiment of data interface 200, the Tr clock delay 245 in the clock path and the Tr delays 222 of the output channel paths share the same delay setting. Thus, when Tr clock delay 245 increases, all of the rising edge delays 222 will increase the same amount as well. Additionally, the alignment from the first stage is not broken. In other embodiments, the falling edge channel delays 224 may be coupled to one of the clock delays.

Steps 360-364 repeat until the Tr delay is increased such that all calibration registers 235 capture a 0, or equivalently there is a positive (zero or greater) phase shift of the falling edges of the output signals compared to a rising edge of the CLK signal. This is to match the clock delay (and all the rising edge channel delays) with the longest falling edge delay.

Section 510 of timing diagram 500 illustrates this process. Effectively, the delay 525 stays constant since only the rising edge delay is changed, thus the delay from the falling edge of Tdin to the falling edge of the calibration register at channel DQ0 is still delay 525. Meanwhile, the increase of clock delay 245 shifts the entire CLK signal to the right. In this manner, the coupling of the rising edges of the output signals and the CLK signal from the first stage is not altered, and the width (duty cycle) of a single bit signal on a channel 205 is bounded by the CLK signal. This helps to ensure accurate retrieval of the data at a memory since the widths of a '0' and a '1' will be kept about equal.

In the third stage of method 300, the falling edges of the channels are aligned. The falling edge delays 224 of each channel are separately incremented to align with the rising edge of the CLK signal. In step 380, a falling edge test pattern is sent again to each channel. In step 382, control circuitry 250 determines whether all of the calibration register outputs are high. In the first pass, this should not be true as all of the outputs were just '0'. If all of the calibration register outputs are high (i.e. a "YES"), then method 300 is done.

In step 384, falling edge channel delay 224 for each channel that is not '1' is incremented. If an output is already high then a delay for that channel will not be incremented. Steps 380-384 are repeated until all of the outputs of the calibration registers 235 change from '0' to '1'. By doing so, the falling edges of the output signals will be aligned with each other and the duty cycle will be aligned with that of the CLK signal.

Section 515 of FIG. 5 shows the result of increasing the respective falling edge channel delays. The delay 535 between the signals at the clock input and data input of the calibration register 235 of channel DQ0 now shows that the data signal of DQ0 is positively (0 or greater) phase shifted compared to the CLK signal. All of the other output signals have similar timings as evidenced by the high output from the calibration registers 235 of the other channels.

Accordingly, during write side skew adjustment, at least one of the edges of the DQ and DQS signals are aligned (or possibly both). Depending on whether the application and/or whether one or two edges are aligned, this skew adjustment may be performed by control circuitry 250, by external circuitry, or during a design process via simulation.

Note that during normal operation, the DQ and DQS signals need to be center aligned. Again, the DQ output register is clocked by the write clock, which has −90° phase shift from system clock; and the DQS output register is clocked by the system clock. Thus, after being edge aligned in the skew adjustment process, the center aligning of the DQ and DQS signals can be done by dynamically changing the PLL phase shift. Note that during skew adjustment that the DQ and DQS signals were timed with clock signals having the same phase shift. Write side calibration can be performed at the power up or anytime during user operation when needed. However, during write side calibration, the normal memory operation should be stopped.

A similar scheme can be used, e.g., by a hard intellectual property (HIP) block, to calibrate the full write path, which starts from an FPGA and ends at the memory device capture register, which uses the DQS as a clock input. When doing full path write side calibration, the test pattern is written in the memory device and read back. In one embodiment, the DQS and DQ signals are aligned at the memory device using the memory device capture registers, whose output would be coupled with the control circuitry, and using DQS as the clock signal in a similar manner as described above. By doing so, static skew among DQ and DQS write paths can be minimized, which include the memory device skew, board skew, package skew and FPGA device skew.

Figure 6:
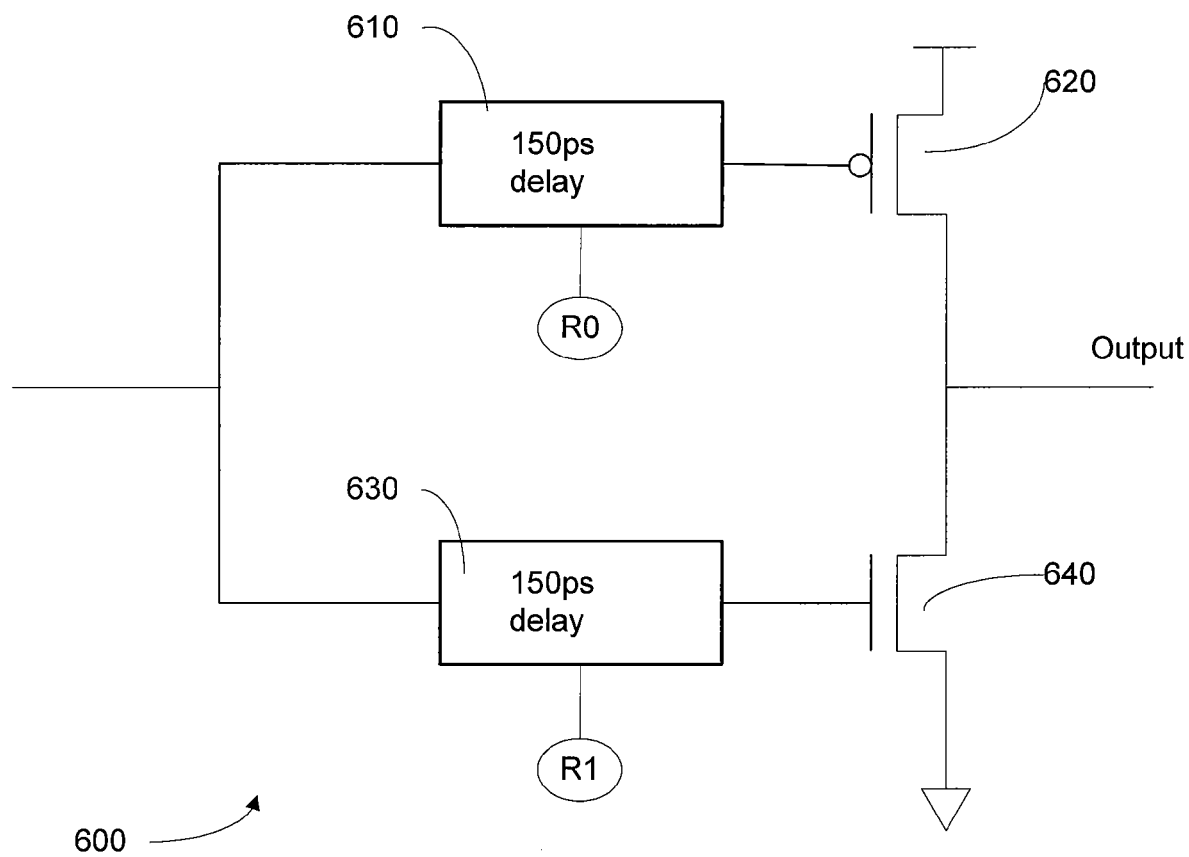
FIG. 6 is a block diagram of an output buffer that may be used in conjunction with embodiments of the present invention.

The rising edge delay 222 and the falling edge delay 224 may be incorporated into a channel in a variety of ways as would be known to one skilled in the art. For example, FIG. 6 is a block diagram of an output buffer 600 that may be used in conjunction with embodiments of the present invention. In one embodiment, a delay chain 610 of 150 ps is inserted in front of PMOS pull-up 620, and another delay chain 630 of 150 ps is inserted in front of NMOS pull-down 640. To increase the output rising edge delay, the pull-down NMOS 640 is turned off first, then the pull-up PMOS 620 turned on after the delay. Similarly, to increase the output falling edge delay, the pull-up PMOS 620 is turned off first, then the pull-down NMOS 640 turned on after the delay. Other embodiments of the present invention may use output buffers and other devices described in expired U.S. Provisional Application No. 60/793,864, and described in concurrently filed and commonly owned U.S. patent application "Duty Cycle and Skew Control", by Xiaobao Wang et al.

Figure 7:
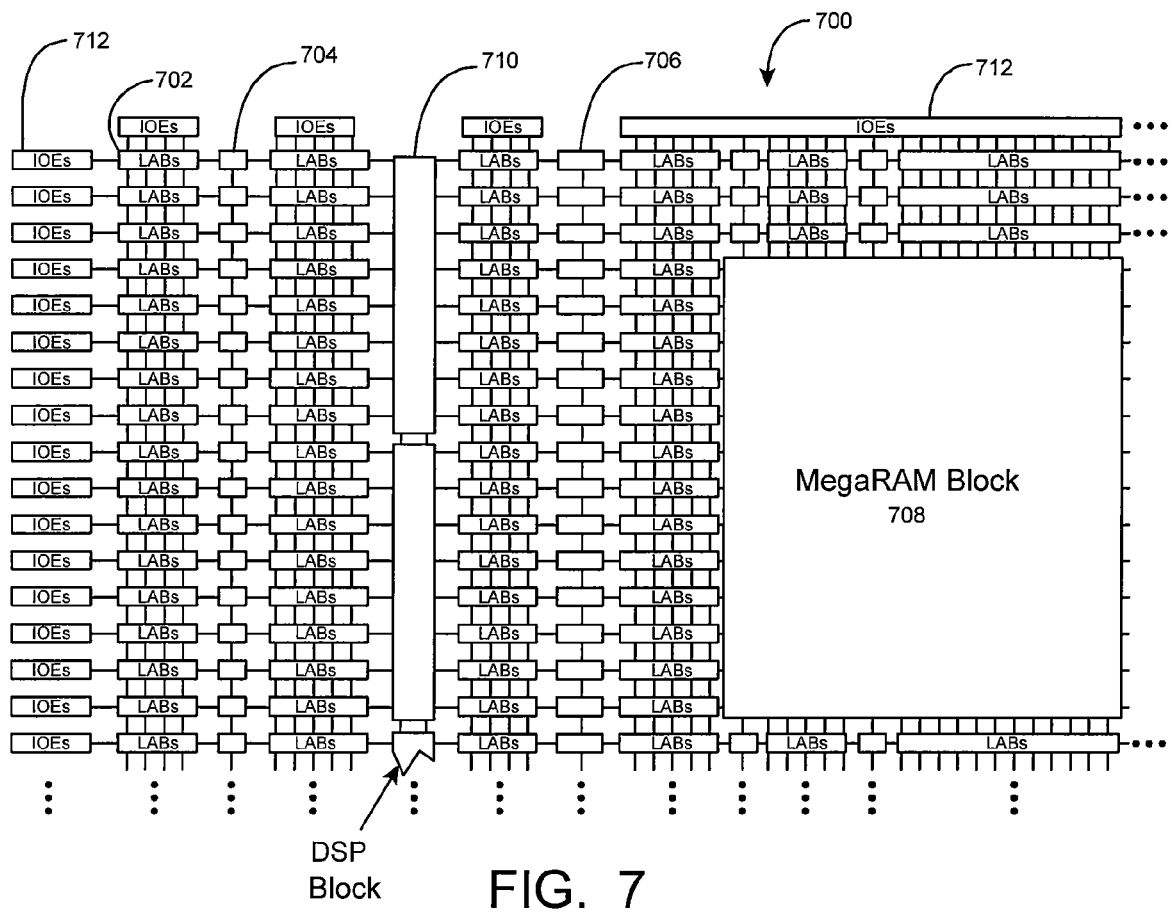
FIG. 7 is a simplified block diagram of a programmable logic device that may benefit by incorporating embodiments of the present invention.

FIG. 7 is a simplified partial block diagram of an exemplary high-density programmable logic device (PLD) 700 wherein techniques according to the present invention can be utilized. PLD 700 includes a two-dimensional array of programmable logic array blocks (or LABs) 702 that are interconnected by a network of column and row interconnections of varying length and speed. LABs 702 include multiple (e.g., 10) logic elements (or LEs), an LE being a small unit of logic that provides for efficient implementation of user defined logic functions.

PLD 700 also includes a distributed memory structure including RAM blocks of varying sizes provided throughout the array. The RAM blocks include, for example, 512 bit blocks 704, 4K blocks 706 and an M-Block 708 providing 512K bits of RAM. These memory blocks may also include shift registers and FIFO buffers. PLD 700 further includes digital signal processing (DSP) blocks 710 that can implement, for example, multipliers with add or subtract features.

PLD 700 also includes input/output elements (IOEs) 712 for providing a communication interface with circuits and devices that are external to PLD 700. These other circuits or devices may reside on another circuit board, a same circuit board, or even the same chip. It is to be understood that PLD 700 is described herein for illustrative purposes only and that the present invention can be implemented in many different types of PLDs, FPGAs, and the other types of digital integrated circuits.

Figure 8:
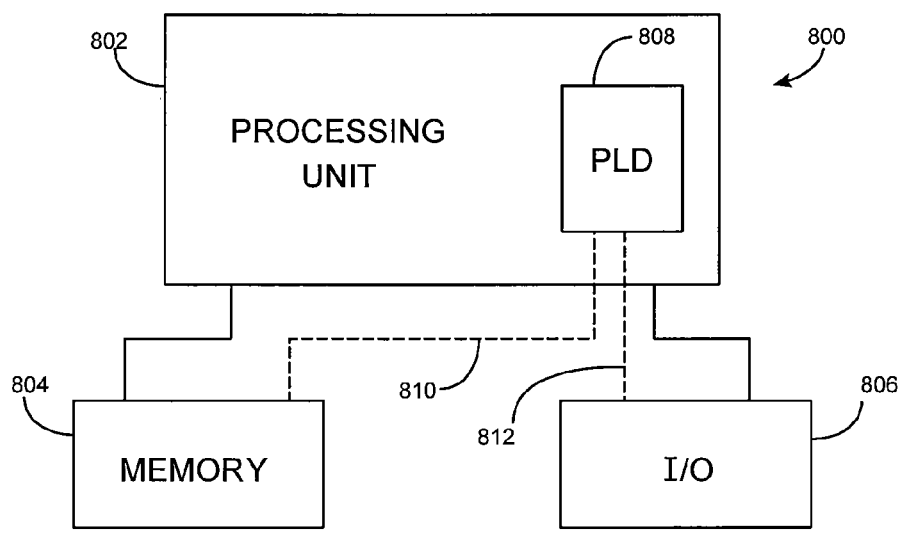
FIG. 8 is a block diagram of an electronic system that may benefit by incorporating embodiments of the present invention.

While PLDs of the type shown in FIG. 7 provide many of the resources required to implement system level solutions, the present invention can also benefit systems wherein a PLD is one of several components. FIG. 8 shows a block diagram of an exemplary digital system 800, within which the present invention may be embodied. System 800 can be a programmed digital computer system, digital signal processing system, specialized digital switching network, or other processing system. Moreover, such systems may be designed for a wide variety of applications such as telecommunications systems, automotive systems, control systems, consumer electronics, personal computers, electronic displays, Internet communications and networking, and others. Further, system 800 may be provided on a single board, on multiple boards, or within multiple enclosures.

System 800 includes a processing unit 802, a memory unit 804 and an I/O unit 806 interconnected together by one or more buses. According to this exemplary embodiment, a programmable logic device (PLD) 808 is embedded in processing unit 802. PLD 808 may serve many different purposes within the system in FIG. 8. PLD 808 can, for example, be a logical building block of processing unit 802, supporting its internal and external operations. PLD 808 is programmed to implement the logical functions necessary to carry on its particular role in system operation. PLD 808 may be specially coupled to memory 804 through connection 810 and to I/O unit 806 through connection 812.

Processing unit 802 may direct data to an appropriate system component for processing or storage, execute a program stored in memory 804 or receive and transmit data via I/O unit 806, or other similar function. Processing unit 802 can be a central processing unit (CPU), microprocessor, floating point coprocessor, graphics coprocessor, hardware controller, microcontroller, programmable logic device programmed for use as a controller, network controller, and the like. Furthermore, in many embodiments, there is often no need for a CPU.

For example, instead of a CPU, one or more PLD 808 can control the logical operations of the system. In an embodiment, PLD 808 acts as a reconfigurable processor, which can be reprogrammed as needed to handle a particular computing task. Alternately, programmable logic device 808 may itself include an embedded microprocessor. Memory unit 804 may be a random access memory (RAM), read only memory (ROM), fixed or flexible disk media, PC Card flash disk memory, tape, or any other storage means, or any combination of these storage means.

Embodiments of the present invention may be used to improve circuits that interface with the memory unit 804. While embodiments of the present invention particularly benefit these interface circuits when memory unit 804 is a double-data rate (DDR) type memory, embodiments may benefit other multiple-data rate types interfaces that are either now known or later developed.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A circuit comprising:
control circuitry having a first output;
a plurality of output channels, each output channel including:
an output timing device having a data input coupled with the first output of the control circuitry;
one or more channel delays, each having an input coupled with the output timing device and having an output coupled with an output pad; and
a calibration timing device having a data input coupled with the channel delays and having an output coupled with the control circuitry; and
a clock path including:
a first node that receives a clock signal and that is coupled with a clock input of each output timing device;
one or more clock delays, each having an input coupled with the first node and an output coupled with a clock input of each calibration timing device, wherein the channel delays and the clock delays are programmable via one or more delay control signals from the control circuitry;
wherein the control circuitry is adapted to:
transmit a first test signal via the first output to the data input of each output timing device;
determine, for each output channel, a relative timing between a first channel signal at the data input of the calibration timing device and a clock signal at the clock input of the calibration timing device, wherein the relative timing is based on the output of the calibration timing device; and
align a first edge of the first channel signals by adjusting at least one of the delays.

2. The circuit of claim 1 wherein a first channel delay for each channel is adjusted and a first clock delay is adjusted.

3. The circuit of claim 1 wherein the relative timing is determined from a logic value of the output of the calibration timing device.

4. The circuit of claim 1 wherein the first edge of the channel signals is the rising edge of the channel signals.

5. The circuit of claim 1 wherein at least one of the output channels carries a data strobe signal.

6. The circuit of claim 1 wherein the control circuitry is adapted to align a first edge by:
incrementing a first clock delay until all of the outputs of the calibration timing devices have a same logic value; and
for each output channel, incrementing a first channel delay until the output of the calibration timing device for that output channel changes a logic value.

7. The circuit of claim 6 wherein the same logic value is a high logic value.

8. The circuit of claim 1 wherein the control circuitry is further adapted to align a second edge of signals at the data input of the calibration devices.

9. The circuit of claim 8 wherein the control circuitry is adapted to align a second edge by:
transmitting a second test signal to the data input of each output timing device;
determining, for each output channel, a relative timing between a second channel signal at the data input of the calibration timing device and a clock signal at the clock input of the calibration timing device based on the output of the calibration timing device; and
aligning a second edge of the second channel signals by adjusting at least another one of the delays.

10. The circuit of claim 9 wherein a second clock delay and a second channel delay for each output channel are coupled with a same delay control signal, and wherein each second channel is adapted to delay only the first edge of a signal, and
wherein the control circuitry is further adapted to align a second edge by:
incrementing the second clock delay and second channel delay until all of the outputs of the calibration timing devices have a same logic value; and
for each output channel, incrementing a third channel delay until the output of the calibration timing device for that output channel changes a logic value, wherein the third channel delay is adapted to delay only the second edge of a signal.

11. The circuit of claim 10, further comprising an output buffer that includes the second and third channel delays.

12. A method of aligning output signals at a data interface comprising:
transmitting a first test signal from control circuitry to data inputs of a plurality of output timing devices, each of a respective output channel;
based on a clock signal, transmitting a first channel signal from each output timing device through one or more channel delays to a respective output pad and a respective calibration timing device;
transmitting the clock signal through one or more clock delays to each of the respective calibration timing devices;
determining, for each output channel, a relative timing between a first channel signal and the clock signal at the calibration timing device based on an output of the calibration timing device, wherein the output of each calibration timing device is coupled with the control circuitry; and
aligning a first edge of the first channel signals by adjusting at least one of the delays.

13. The method of claim 12 wherein the calibration timing devices reside within a memory device external from an integrated circuit in which the control circuitry resides, and wherein the clock signal is a data strobe signal.

14. The method of claim 12 wherein aligning a first edge comprises:
incrementing a first clock delay until all of the outputs of the calibration timing devices have a same logic value; and
for each output channel, incrementing a first channel delay until the output of the calibration timing device for that output channel changes a logic value.

15. The method of claim 12 wherein the data interface is a double-data rate interface.

16. The method of claim 12 wherein the data interface is on a field programmable gate array.

17. The method of claim 12, further comprising aligning a second edge of signals at the data input of the calibration devices by:

transmitting a second test signal from control circuitry to the data inputs of the output timing devices;

determining, for each output channel, a relative timing between a second channel signal and the clock signal at the calibration timing device based on an output of the calibration timing device; and aligning a second edge of the second channel signals by adjusting at least another one of the delays.

18. The method of claim 17 wherein a second clock delay and a second channel delay for each output channel are coupled with a same delay control signal; and adapted to delay only the first edge, and wherein aligning a second edge comprises:

incrementing the second clock delay and second channel delay until all of the outputs of the calibration timing devices have a same logic value; and for each output channel, incrementing a third channel delay until the output of the calibration timing device for that output channel changes a logic value, wherein the third channel delay is adapted to delay only the second edge of the channel signals.

19. A method of aligning output signals at a data interface, the method comprising:

determining a first output delay in each of the output signal paths, the first output delay providing a delay to both rising and falling edges;

determining a first clock delay in a clock signal path, such that a first edge of each of the output signals are aligned with each other and with the clock signal;

determining a rising edge delay in each of a plurality of output signal paths; and determining a falling edge delay in each of the output signal paths, wherein the rising edge delay for at least one output signal path is independent from the falling edge delay for the at least one output signal path, and wherein the determined rising edge delays and the falling edge delays are used to provide an alignment of the rising and falling edges of the output signals.

20. The method of claim 19 wherein one of determining a rising edge delay and determining a falling edge delay aligns the duty cycle of the output signals with the duty cycle of the clock signal, wherein each of that one delay has the same value as a second clock delay in the clock signal path, and wherein the second of determining a rising edge delay and determining a falling edge delay aligns the second edge of each of the output signals.

21. The method of claim 19, further comprising storing values for the determined delays in one or more memory elements such that output delay elements in the output signal paths and at least one clock delay element in the clock signal path are programmed to have the determined delays.

22. The method of claim 19 wherein determining the rising edge delay and determining the falling edge delay are performed by circuitry that is not on a same integrated circuit as the data interface.

23. The method of claim 19, wherein the wherein the rising edge delay for each of the output signal paths is independent from the falling edge delay for any of the output signal paths.

24. The method of claim 19 wherein determining a first clock delay comprises incrementing the first clock delay until all of the first edges of the output signals are negatively phase shifted from the clock signal, and wherein determining a first output delay in each of the output signal paths comprises incrementing the first output delay until each output signal is zero or greater phase shifted from the clock signal.

25. The method of claim 24 wherein one of determining a rising edge delay and determining a falling edge delay comprises incrementing that delay until all of the second edges of the output signals are negatively phase shifted from the clock signal and wherein each of that one delay has the same value as a second clock delay in the clock signal path, and wherein the second of determining a rising edge delay and determining a falling edge delay comprises incrementing that delay until each output signal has a zero or greater phase shift from the clock signal.

* * * * *